Sept. 15, 1953     S. MECKLER     2,651,991
GRIPPER FOR PRINTING PRESSES
Filed Jan. 7, 1949
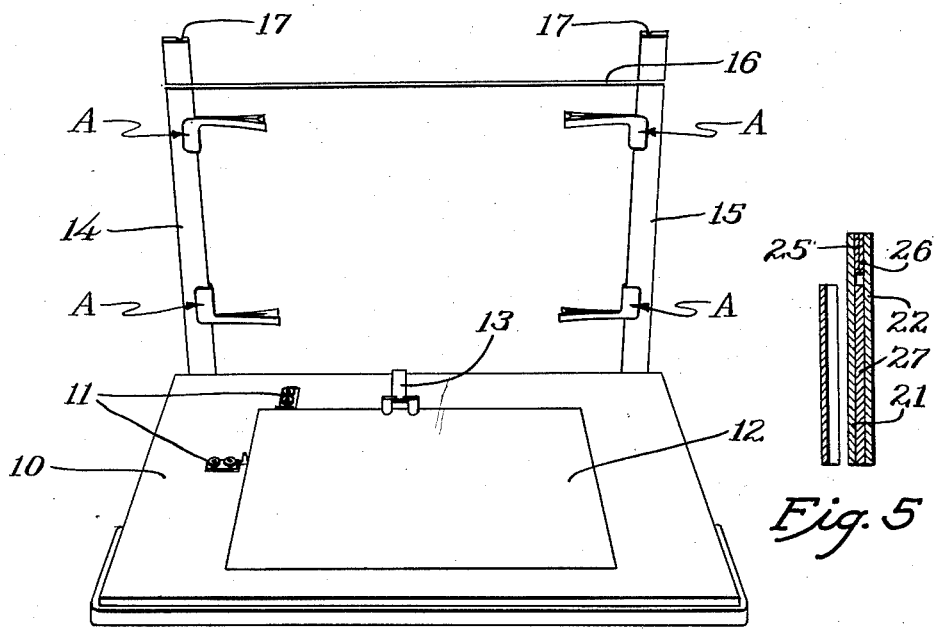
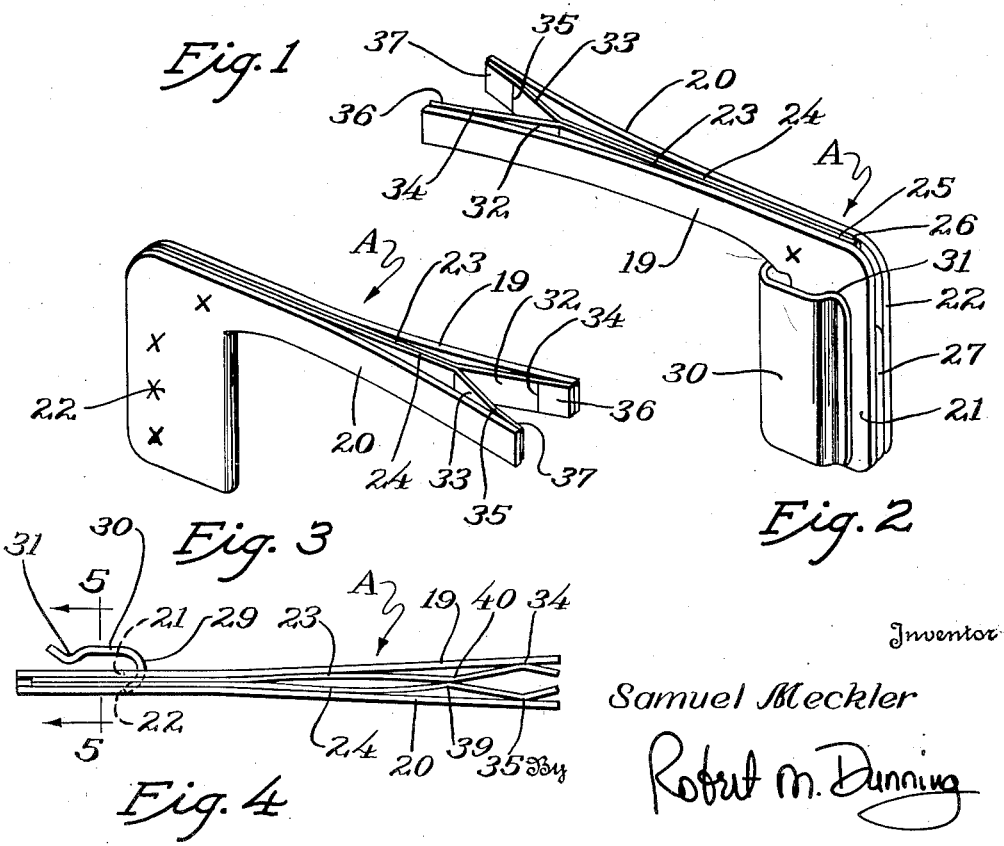
Inventor
Samuel Meckler
By Robert M. Dunning Patented Sept. 15, 1953

2,651,991

UNITED STATES PATENT OFFICE 2,651,991

GRIPPER FOR PRINTING PRESSES

Samuel Meckler, St. Paul, Minn.

Application January 7, 1949, Serial No. 69,716

1 Claim. (Cl. 101—408)

My invention relates to an improvement in gripper for printing presses and relates particularly to a device for holding a sheet stationary as it is printed by a platen press or similar device.

In printing sheets upon a platen press, it is common practice to place the sheet upon the tympan in proper location against suitable registering guides. The sheet is carried with the tympan into proper location to be printed. Grippers are sometimes provided for gripping the sheet and holding it against the tympan to prevent the sheet from being pulled out of place by action of the press to cause a slurring of the print. As in many cases the printing made is mainly located at one area of the sheet, the sheet will otherwise sometimes be pulled out of place during the printing operation. The present invention relates to a spring gripper which is designed to be mounted on a gripper bar overlying the tympan at each side thereof to engage against the sheet and to hold it firmly in place during the printing operation.

In my previous Patent No. 2,014,975, issued September 17, 1935 I disclose a spring gripper having a pair of spring fingers which were urged apart by auxiliary springs located between the spring fingers. An anchoring clip was formed integrally with one of the fingers. While this device was entirely practical for its intended purpose, certain difficulties in construction were found. In the first place the auxiliary springs were spot welded to the ends of the spring fingers and the other ends of these springs slidably engaged the outer surfaces of the fingers. After a period of time the free ends of the springs dug into the spring fingers and interfered with the proper operation of the gripper. Furthermore, the welding of the spring fingers at the end thereof tended to change the temper of the spring at this point where considerable stress was normally applied. As a result the springs had a tendency to bend or break in operation. The shoulder formed in the fingers by the constant sliding contact of the free ends of the springs also placed stress upon the springs as the fingers were compressed together and in time tended to break the springs.

It is an object of the present invention to provide a sheet gripper which has some similarity to the structure shown in my previous patent, but which does not possess similar disadvantages. As a result the grippers will be operable for a greater period of time and will not break as easily as those previously described.

A feature of the present invention lies in the provision of a sheet gripper including a pair of spring fingers having auxiliary springs therebetween for urging the fingers apart and in anchoring the auxiliary springs between the fingers at the end opposite the free ends of the fingers. As a result the strain upon the fingers is not at a maximum near the point of attachment so that the temper of the springs at the anchored end thereof may be changed without greatly affecting the operation of the auxiliary springs. Thus if the springs are hardened or softened by the welding operation, the springs will not tend to break as the strain upon the springs is at a point remote from the point of attachment.

A further feature of the present invention lies in the fact that the springs are substantially co-extensive with the gripping fingers and do not wear a shoulder in the fingers under constant operation. In actual practice the ends of the springs are shaped to bend away from the gripping fingers as the fingers are compressed together, thereby preventing injury to the springs under constant use.

A feature of the present invention resides in the specific manner in which the springs are formed. The springs extend in closely adjacent relationship throughout a major portion of their length and then diverge toward the free ends of the spring arms. A slight bend is provided at a point spaced from the extremities of the springs so that the ends of the springs are somewhat more nearly parallel than the diverging portions previously described. As a result as the fingers compress together, the spring extremities move together until they are parallel to the adjacent portions of the fingers. Further compression of the fingers tends to bend the free ends of the springs into converging relation, acting to space the free ends of the springs inwardly from the free ends of the fingers. As a result the free ends of the springs can not dig into the fingers and wear a portion thereof to cause a shoulder on the inner surface of the fingers capable of breaking the springs if the fingers are compressed together an unusual amount.

These and other objects and novel features of my invention will be more clearly and fully set forth in the following specification and claim.

In the drawings forming a part of my specification:

Figure 1 is a diagrammatic perspective view of the tympan and gripper bars of a platen press showing in general the relationship of my grippers thereupon.

Figure 2 is a perspective view of the gripper removed from the gripper bar.

Figure 3 is a perspective view of the opposite side of the gripper shown in Figure 2.

Figure 4 is a top plan view of the gripper in partially compressed position.

Figure 5 is a sectional view through the end of the gripper the position of the section being indicated by the line 5—5 of Figure 4.

With reference to Figure 1 of the drawings it will be noted that the platen press tympan 10 is provided with adjustable gauges or guides 11 thereupon which assist in properly registering the sheet to be printed which is indicated by the numeral 12. A guide 13 may also be used to hold the sheet in proper location on the tympan 10.

A pair of gripper bars 14 and 15 are mounted to fold relative to the tympan 10 so as to extend over the surface thereof. A connecting means 16 may be provided to connect the gripper bars 14 and 15. The gripper bars are usually provided with longitudinally extending grooves such as 17 in one surface thereof parallel to the inner side edge of each bar. These grooves are of assistance in holding the grippers from disengagement.

The grippers are indicated in general by the letter A. Four such grippers are illustrated in Figure 1, two being supported on each of the bars 14 and 15.

As illustrated in Figures 2, 3, and 4 of the drawings, the gripper bars A include a pair of spring fingers 19 and 20. These fingers 19 and 20 are relatively long and narrow and are provided with a right angularly extending enlarged anchoring portion. The anchoring portion of the finger 19 is indicated by the numeral 21, while the anchoring portion of the finger 20 is indicated by the numeral 22.

A pair of auxiliary springs 23 and 24 are supported between the spring fingers 19 and 20. The springs 23 and 24 are usually rectangular in outline and are of substantially the same width as the fingers 19 and 20. The ends 25 and 26 of the springs 23 and 24 are anchored between the anchoring ends 21 and 22 of the fingers 19 and 20. In order to hold the enlarged ends of the fingers in parallel relation a substantially rectangular spacing member 27 is welded or otherwise affixed between the anchoring ends 21 and 22. The anchoring end 22 of the finger 20 is provided with a curved flange 29 along its inner edge which is bent to enclose the inner edge of the anchoring end 21 and to support a flange 30 parallel to the anchoring ends 21 and 22. The flange 30 is provided with an inwardly extending ridge 31 designed to extend into a groove 17 of one of the gripping bars 14 or 15. The inwardly projecting ridge 31 is parallel to the edge of the anchoring ends 21 and 22 and extends generally at right angles to the fingers 19 and 20.

As best illustrated in Figures 2, 3, and 4 of the drawings the springs 23 and 24 normally extend in substantially parallel relationship throughout the major portion of their length and then diverge apart to provide the outwardly diverging portions 32 and 33. These ends 32 and 33 are bent at 34 and 35 respectively to form extremities 36 and 37 which diverge at a lesser angle than the portions 32 and 33. The purpose of this construction will be evident when the structure has been described in detail.

The fingers 19 and 20 bend apart from a point adjacent the anchoring ends 21 and 22 as indicated in Figures 2 and 3 of the drawings. However, when the platen of the press moves toward the tympan 10, the arms 19 and 20 are compressed together until they are almost in parallel relationship. As the arms compress together the springs 23 and 24 bend in a somewhat unusual manner. The compression of the fingers 19 and 20 acts upon the ends of the springs which causes the springs to be pressed together at the points of bend 39 and 40 between the relatively straight portions of the springs and the outwardly diverging portions 32 and 33. The engagement of the portions 39 and 40 tends to bow the normally contacting portions of the spring between the points 39 and 40 and the anchored ends thereof apart as indicated in Figure 4 of the drawings.

As the ends of the fingers 19 and 20 compress together the extremities 36 and 37 of the springs come into parallel contacting relation with the ends of the fingers 19 and 20. Further compression of the fingers causes the extremities 36 and 37 to bend inwardly or converge together as also illustrated in Figure 4 of the drawings. Thus the points of bend indicated at 34 and 35 form the contact with the fingers 19 and 20. This bent surface of the springs does not wear upon the arms in the same manner as the ends of the springs and therefore the sliding of the springs relative to the fingers does not cause any appreciable wear.

The further compression of the fingers 19 and 20 toward one another causes actual contact between the ends of the spring and divides the springs into two portions which are slightly spaced throughout most of their length, but which contact at their extremities and also at the points of bend 39 and 40. This double bowing of the spring produces a strong spring effect and yet the springs can be substantially flattened without being bent beyond the elastic limit.

In accordance with the patent statutes, I have described the principles of construction and operation of my gripper for platen presses, and while I have endeavored to set forth the best embodiment thereof, I desire to have it understood that obvious changes may be made within the scope of the following claim without departing from the spirit of my invention.

I claim:

A gripper comprising a pair of resilient fingers anchored relative to each other at one end thereof, a pair of springs between said fingers, each spring including first, second and third sections, said first sections having their distal ends anchored between the anchored ends of said resilient fingers, said second sections residing intermediate said first and third sections and being in diverging relation with respect to said first sections, and said third sections being at a lesser degree of divergence than said second sections and slidably bearing against said resilient fingers whereby flexing of said resilient fingers toward each other will produce a double bowing of said springs in which the junctures of said first and second sections abut against each other and the junctures of said second and third sections abut respectively against said resilient fingers.

SAMUEL MECKLER.

References Cited in the file of this patent

UNITED STATES PATENTS

| Number | Name | Date |
|---|---|---|
| 669,882 | Mobley | Mar. 12, 1901 |
| 905,869 | Grove | Dec. 8, 1908 |
| 1,400,303 | Megill | Dec. 13, 1921 |
| 1,496,656 | Cunningham | June 3, 1924 |
| 1,542,734 | Sherfy | June 16, 1925 |
| 2,014,975 | Meckler | Sept. 17, 1935 |